US008517338B2

(12) United States Patent
Hunnekuhl et al.

(10) Patent No.: US 8,517,338 B2
(45) Date of Patent: Aug. 27, 2013

(54) DIAPHRAGM VALVE

(75) Inventors: Christian Hunnekuhl, Osnabrueck (DE); Juergen Stumpp, Klettgau (DE); Joerg Hunnekuhl, Jestetten (DE); Walter Bannwarth, Lauchringen (DE)

(73) Assignee: Georg Fischer Rohrleitungssysteme AG, Schaffhausen (CH)

( * ) Notice: Subject to any disclaimer, the term of this patent is extended or adjusted under 35 U.S.C. 154(b) by 70 days.

(21) Appl. No.: 13/259,303

(22) PCT Filed: Mar. 11, 2010

(86) PCT No.: PCT/EP2010/053105
§ 371 (c)(1),
(2), (4) Date: Nov. 14, 2011

(87) PCT Pub. No.: WO2010/112313
PCT Pub. Date: Oct. 7, 2010

(65) Prior Publication Data
US 2012/0056120 A1 Mar. 8, 2012

(30) Foreign Application Priority Data
Apr. 1, 2009 (EP) .................................. 09157066

(51) Int. Cl.
*F16K 7/00* (2006.01)
(52) U.S. Cl.
USPC ........................................ 251/331; 251/367

(58) Field of Classification Search
USPC ................. 251/331, 335.2, 129.17, 366–367
See application file for complete search history.

(56) References Cited

U.S. PATENT DOCUMENTS

| | | | | |
|---|---|---|---|---|
| 1,800,157 A | * | 4/1931 | Saunders | 251/331 |
| 3,157,383 A | * | 11/1964 | Price | 251/331 |
| 3,285,563 A | * | 11/1966 | Clarkson | 251/8 |
| 4,044,990 A | * | 8/1977 | Summerfield | 251/8 |
| 4,376,315 A | | 3/1983 | Badger et al. | |
| 4,475,709 A | * | 10/1984 | Becker, Jr. | 251/6 |
| 4,899,783 A | * | 2/1990 | Yusko et al. | 251/7 |
| 6,289,933 B1 | * | 9/2001 | Fischer | 251/331 |
| 6,416,038 B1 | | 7/2002 | Sindel et al. | |
| 6,991,209 B2 | * | 1/2006 | Ball | 251/8 |
| 2007/0262277 A1 | | 11/2007 | Williams et al. | |

FOREIGN PATENT DOCUMENTS

| | | |
|---|---|---|
| CH | 686051 | 12/1995 |
| DE | 102004001045 | 8/2005 |
| GB | 743144 | 1/1956 |

* cited by examiner

*Primary Examiner* — John Bastianelli
(74) *Attorney, Agent, or Firm* — Bachman & LaPointe, P.C.

(57) ABSTRACT

Diaphragm valve (1) comprising a housing upper part (2), which receives an actuating device (4) for actuating the valve (1), and a housing lower part (3), which has a receiving region (9) for receiving a diaphragm (11), wherein in the housing lower part (3) below the diaphragm (11) a central region forming a flow channel (17) is designed, wherein the cross-sectional surface of the flow channel (17) in the central region (51) of the housing lower part (3) is constant when the valve (1) is in the open state.

7 Claims, 6 Drawing Sheets

DIAPHRAGM VALVE

BACKGROUND OF THE INVENTION

The present invention relates to a diaphragm valve comprising a housing top part, which receives an actuating device for actuating the valve, and a housing bottom part, which has a receiving region for receiving a diaphragm, wherein in the housing bottom part beneath the diaphragm is configured a central region forming a flow channel.

In pipeline construction, diaphragm valves are used to regulate flow rates of different mediums. A diaphragm valve is characterized by few individual parts which come into contact with the medium. When the actual control element of the valve is replaced, only the diaphragm needs to be exchanged. The diaphragm valve tends to be insensitive to dirt contamination. A diaphragm valve is therefore well suited to the regulation of medium flows which contain solids.

DE 10 2004 001 045-A1 discloses a diaphragm valve of the generic type, wherein the cross-sectional area, in dependence on the flow path, steadily decreases from the housing inlet to the sealing land and then steadily increases again from the sealing land to the housing outlet.

Starting from this prior art, the object of the invention is to define a diaphragm valve wherein the flow through the valve housing is realized as evenly as possible and without obstacles.

SUMMARY OF THE INVENTION

This object is achieved by a diaphragm valve comprising a housing top part, which receives an actuating device for actuating the valve, and a housing bottom part, which has a receiving region for receiving a diaphragm, wherein in the housing bottom part beneath the diaphragm is configured a central region forming a flow channel, the cross-sectional area of the flow channel in the central region of the housing bottom part being constant in the open state of the valve.

It is advantageous for the diaphragm valve to be easily installable in existing pipelines. This is achieved by virtue of the fact that, viewed in the direction of flow, the cross-sectional area of the flow channel has successively a circular shape, an oval shape and a circular shape. The diaphragm valve is configured symmetrically in relation to the centerline of the diaphragm and can be installed in both directions in the piping system.

It is also advantageous for the diaphragm to be able to be installed as easily as possible in the valve housing. This is achieved by virtue of the fact that the housing top part has an inner housing and an outer housing, the outer housing being arranged such that it is connected to the receiving region of the housing bottom part. This is achieved by virtue of the fact that the diaphragm is arranged in the receiving region between the base of the receiving region and the bottom edge of the inner housing.

BRIEF DESCRIPTION OF THE DRAWINGS

An illustrative embodiment of the invention is described with reference to the figures, wherein.

DETAILED DESCRIPTION

Figure 1:
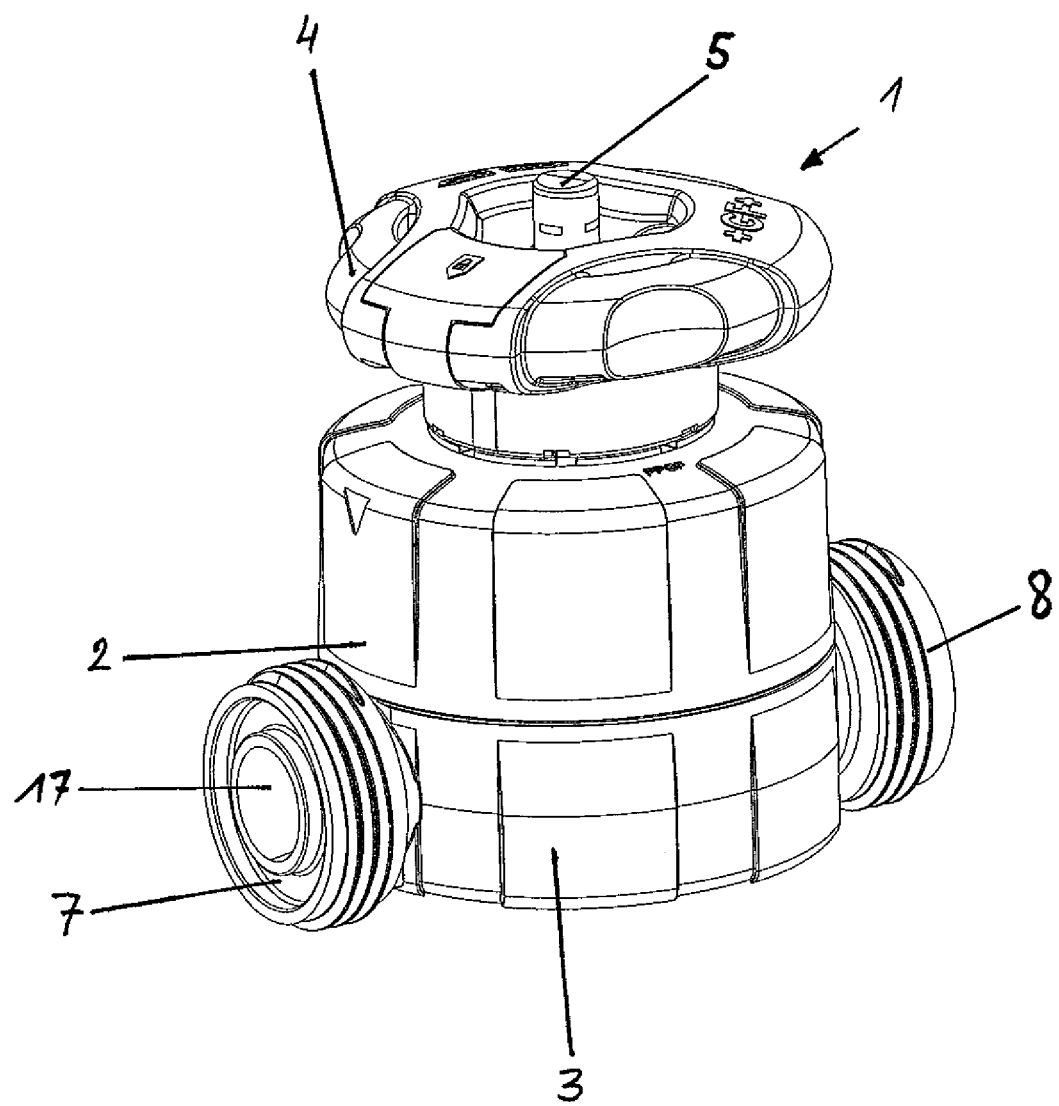
FIG. 1 shows a perspective view of a diaphragm valve according to the invention.

In FIG. 1, a diaphragm valve 1 is shown in perspective representation. The diaphragm valve 1 substantially consists of a housing top part 2, a matching housing bottom part 3, and an actuating member, here represented as a handwheel 4 having an indicating pin 5. The housing bottom part 3 has three openings 7, 8, 9 and a flow channel 17. A first opening 9 is disposed between the housing top part 2 and the housing bottom part 3 and configured perpendicular to the flow channel 17 and is configured as a receiving region 9 for the diaphragm 11. The two further openings 7, 8 are configured as pipe connecting elements 7, 8 for connecting the diaphragm valve 1 to the piping system.

Figure 2:
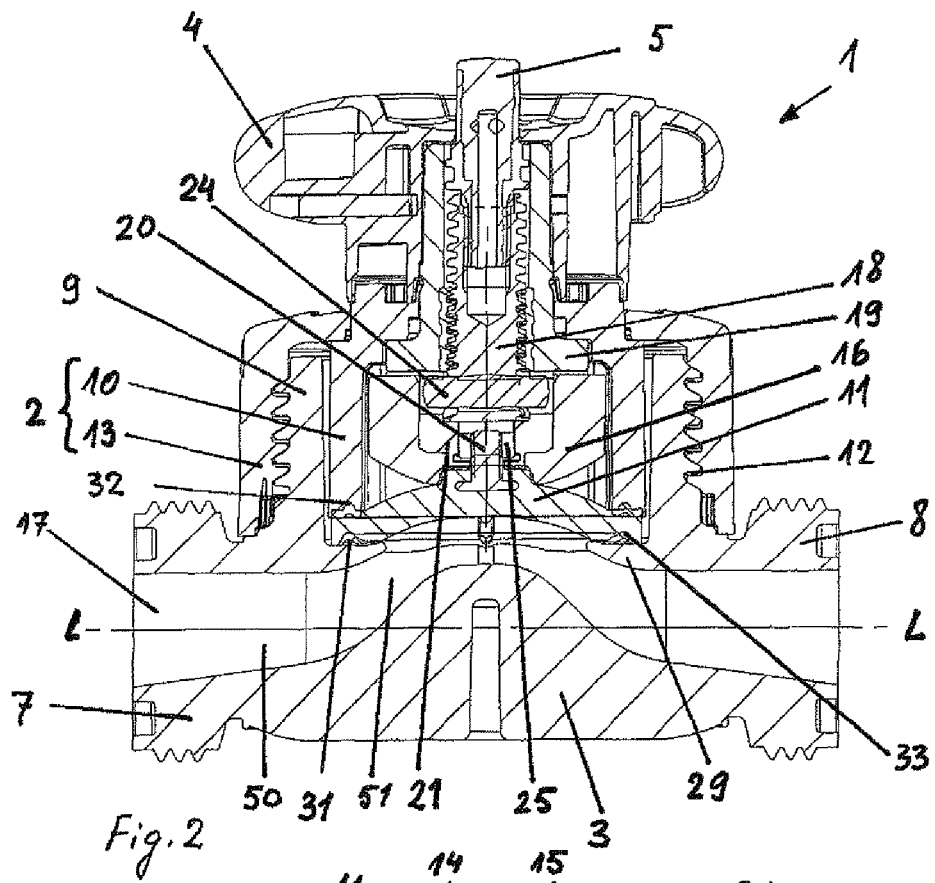
FIG. 2 shows a section through the diaphragm valve of FIG. 1.
Figure 3:
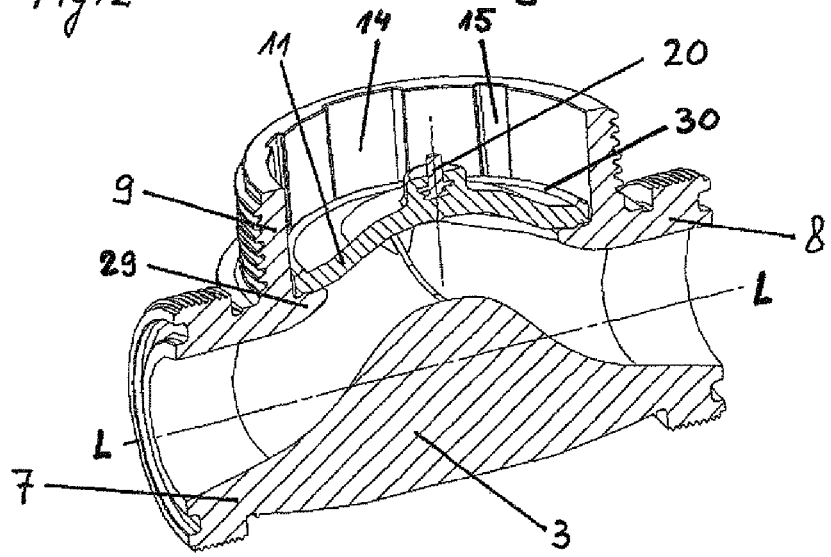
FIG. 3 shows a perspectively sectioned region of the diaphragm valve.

In FIG. 2, the diaphragm valve 1 of FIG. 1 is represented sectioned along the pipeline axis L. In FIG. 3, the housing bottom part 3 is sectioned along the pipeline axis L and shown in perspective representation. The flow channel 17 has no sharp edges or steps. The pipelines are screwed onto the two pipe connecting elements 7, 8, or, in a corresponding embodiment, connected by another connection method, for example by arc welding or with a flange joint. The diaphragm valve 1 is configured symmetrically and indifferently with respect to the direction of flow. The axis of symmetry is here represented by the centerline of the diaphragm 11. Both the first pipe connecting element 7 and the second pipe connecting element 8 can be used both as an inflow and as an outflow for the flow channel 17. The diaphragm valve 1 can be installed in any position without regard to the direction of flow.

The receiving region 9 of the housing bottom part 3 is of circular configuration. The receiving region 9 serves not only to receive the diaphragm 11 but also to fasten the housing top part 2. The housing top part 2 consists of an inner housing 10 and an outer housing 13. On the outer side of the receiving region 9 is configured, for example, a screw thread 12 for the screw connection to the outer housing 13. On the inner side of the receiving region 9, as can be seen in FIG. 3, are configured a plurality of axially running recesses 14, 15. The two identical recesses 14 disposed one opposite the other along the centerline of the diaphragm 11 serve for the fixing of the diaphragm 11. A further four recesses 15 in each case, arranged offset by 90°, serve for the fixing of the inner housing 10, which on the outer side has four cams which fit with the recesses 15. The receiving region 9, the inner housing 10 and the outer housing 13, arranged concentrically to the inner housing 10, of the housing top part 2 are of circular configuration. The diaphragm 11 thus has an indexing which is separate from the indexing of the inner housing 10. The effect of this is that the inner housing 10 can be used turned, with the diaphragm position remaining constant.

The diaphragm 11 is arranged clamped in the receiving region 9 between the base 29 of the receiving region 9 and the bottom edge of the inner housing 10. The clamping of the diaphragm 11 is achieved by the connection of the housing top part 2 to the housing bottom part 3. The bottom edge of the inner housing 10, the base 29 of the receiving region 9 and the rim of the diaphragm 11 respectively have beads 30, 31 and grooves 32, 33 configured complementary to one another, whereby a form closure between the diaphragm 11 and the valve housing and a defined position of the diaphragm 11 is achieved.

The new diaphragm valve 1 uses, for assembly, no screws, springs or nuts which bore through the housing bottom part 3 perpendicularly to the direction of flow, as is the case with traditional diaphragm valves. The valve housing hereby acquires a round instead of a square shape, viewed in the direction of the spindle. The diaphragm valve 1 can be produced substantially from plastics parts and can be produced without metallic elements such as screws, springs and nuts. Should the clamping of the diaphragm 11 slacken in the course of its life, then the housing top part 2 can subsequently be further screwed together with the housing bottom part 3 to ensure adequate clamping. Because the clamping of the diaphragm 11 is produced solely by the screwing of the housing top part 2 in the housing bottom part 3, the clamping is substantially more uniform than with traditional diaphragm valves, where more of a punctiform clamping is achieved by four screws in the corners of the valve housing.

The flow channel 17 between the pipe connecting elements 7, 8 is configured in the housing bottom part 3 such that the cross-sectional area is constant over the entire length of the flow channel 17 in a central region 51 of the diaphragm valve 1 in the open state. Viewed in the direction of flow, the cross-sectional area assumes successively a circular shape, an oval shape and again a circular shape. The transitions between these shapes are of continuous configuration.

Figure 4:
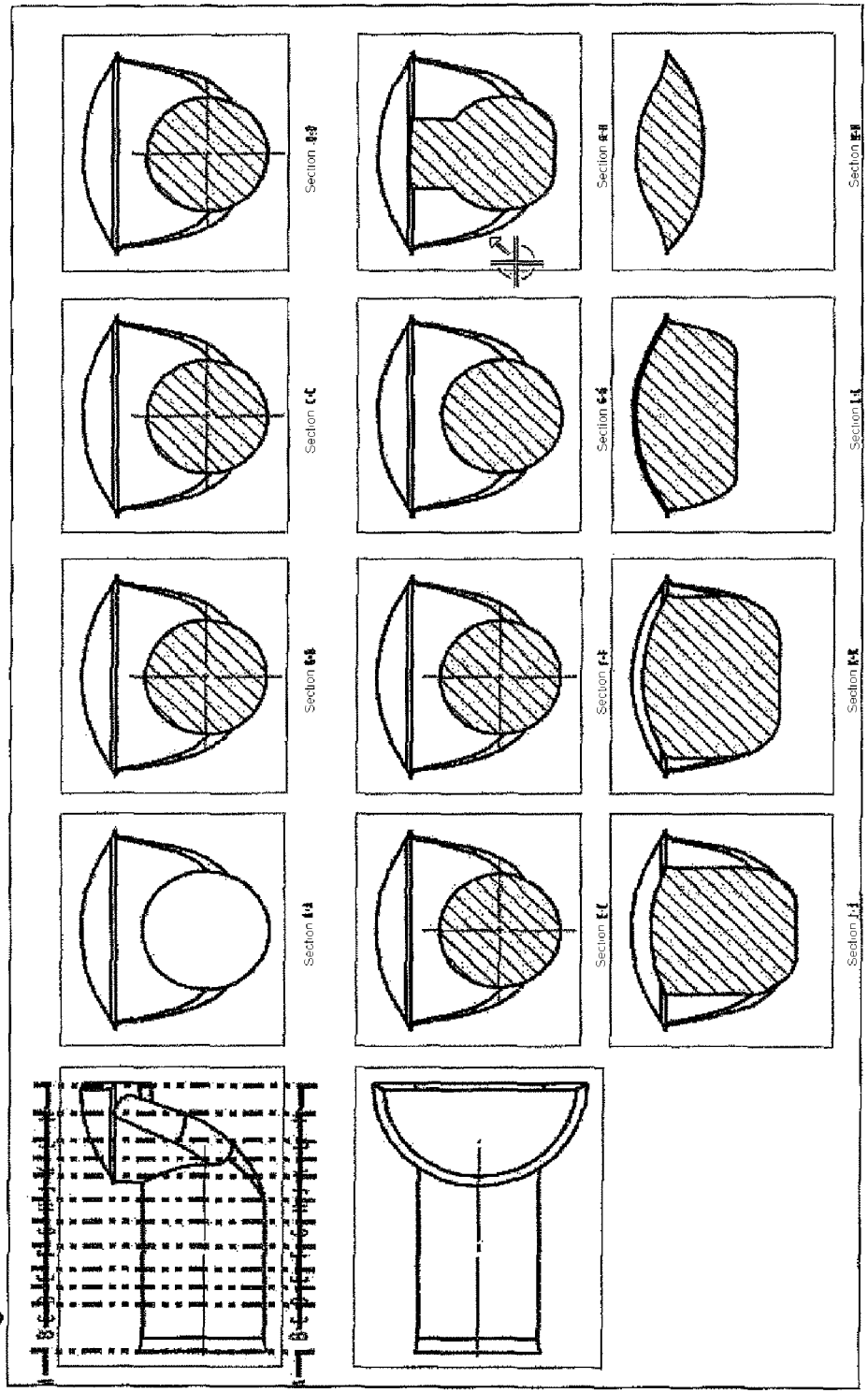
FIG. 4 shows a representation of the cross-sectional areas in different portions of the flow channel of an existing diaphragm valve.

In FIG. 4, twelve sections through the flow channel of a traditional diaphragm valve are represented. The sections are placed at successive points in the flow channel, from the start of the flow channel by the pipe connecting element to the centerline of the diaphragm. The cross-sectional areas are shown respectively in shaded representation. The shape of the cross-sectional areas changes from circular via bottle-shaped, rectangular with rounded corners, to drip-shaped.

Figure 5:
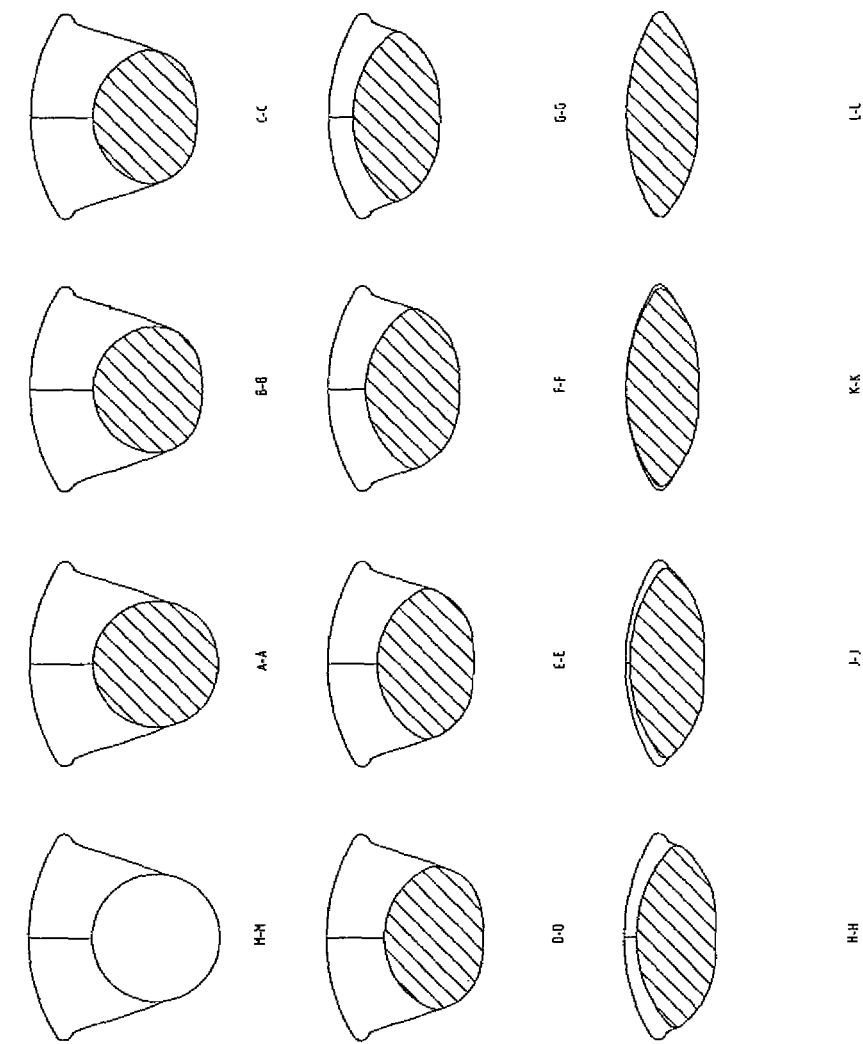
FIG. 5 shows a representation of the cross-sectional areas in different portions of the flow channel of the diaphragm valve according to the invention.
Figure 5:
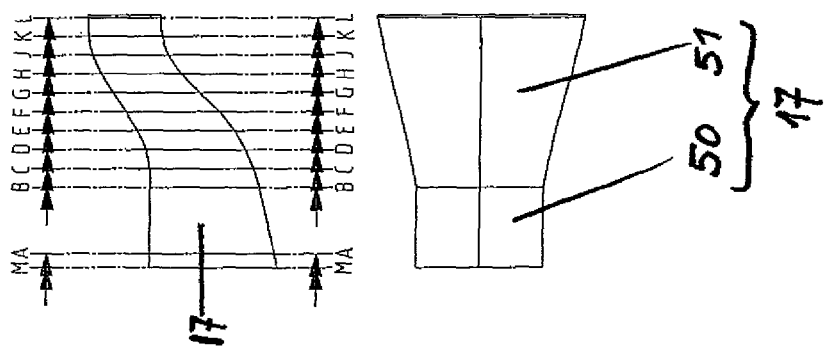

In FIG. 5, a further twelve sections through the flow channel 17 of the diaphragm valve 1 according to the invention are represented. The sections are likewise made at successive points in the flow channel 17, from the start of the flow channel 17 by the pipe connecting element 7, 8 to the centerline of the diaphragm 11. The cross-sectional areas are shown respectively in shaded representation. The shape of the cross-sectional areas changes from circular at the start of the housing bottom part 3 to oval in a central region 51 beneath the diaphragm 11.

Figure 6:
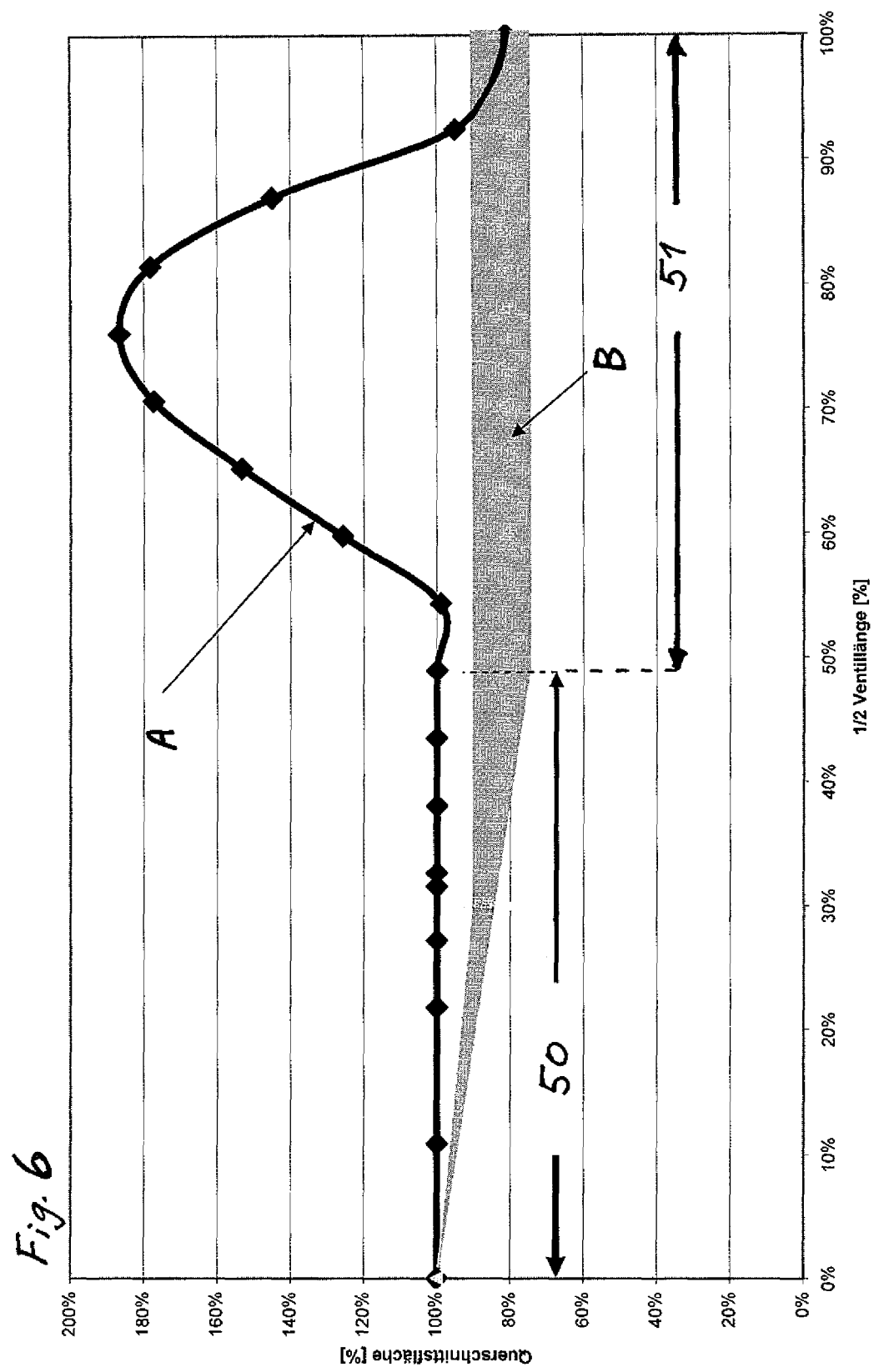
FIG. 6 shows a graph for comparing the change in cross-sectional area as a function of the length of the flow channel.

In FIG. 6, the change in cross-sectional area in the flow channel 17 over half the length of the diaphragm valve 1 from the inlet of the housing bottom part 3 to the centerline of the diaphragm 11 is represented. The change is represented related in percentages to the cross-sectional area at the inlet of the housing bottom part 3. The valve length comprises an inlet region 50 from 0% to around 50% of half the valve length and a central region 51 from around 50% to 100% of half the valve length. In FIG. 6, the line A represents the change in cross-sectional area in the flow channel of a traditional diaphragm valve. From the line A in FIG. 6 can be read that the cross-sectional area in the central region of the diaphragm valve, i.e. beneath the diaphragm, repeatedly drastically changes, which leads to considerable pressure differences and fluctuations in the efficiency of the diaphragm valve.

The shaded region B in FIG. 6 represents the change in cross-sectional area in the flow channel 17 of the diaphragm valve 1 according to the invention. The region B likewise depicts the tolerance limits of the percentage change in the diaphragm valve 1 according to the invention. From the region B in FIG. 6 can be read that, in the inlet region 50 of the flow channel 17, the cross-sectional area steadily declines from 100% to around 85% to 75%, and that, in the following central region 51, the cross-sectional area remains constant at around 75% to 85% of the initial value.

In FIG. 2, further elements of the valve actuating mechanism are visible in the inner housing 10: a pressure piece 16, which serves for the uniform deformation of the diaphragm 11, the actual spindle 18, and a spindle nut 19, which ensures that the rotary motion of the handwheel 4 is converted into an axial motion of the spindle 5 with the pressure piece 16. In FIG. 3, the housing bottom part 3, the diaphragm 11 and a diaphragm pin 20 are shown in perspective and sectioned representation.

Figure 7:
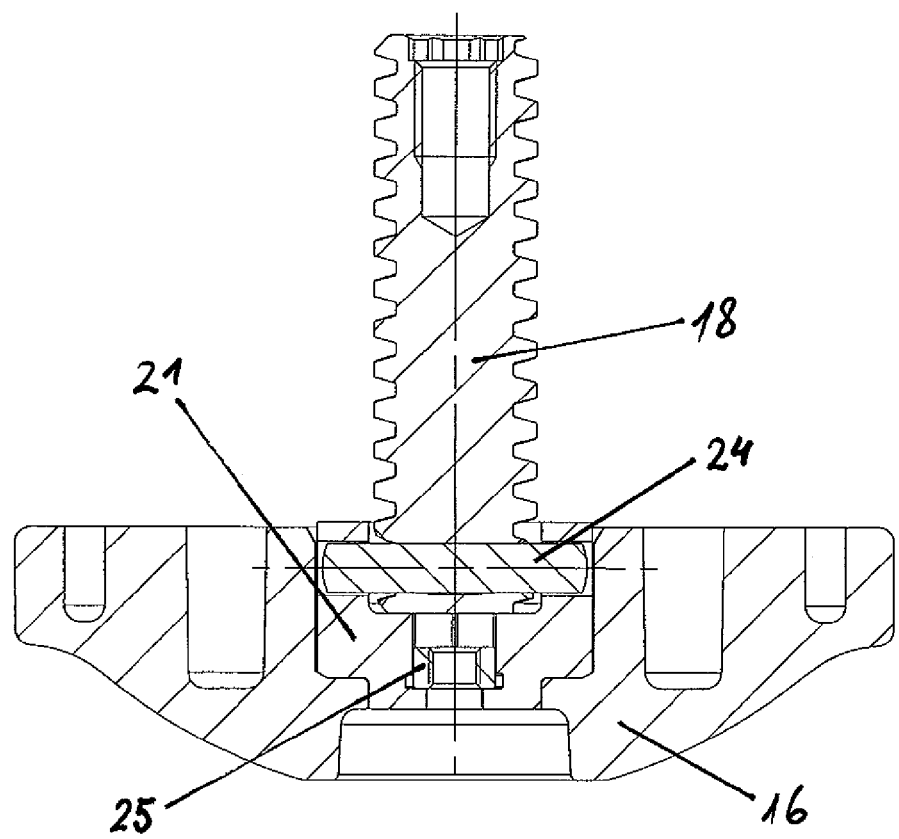
FIG. 7 shows a section through the assembly of diaphragm holder and spindle of the diaphragm valve.
Figure 8:
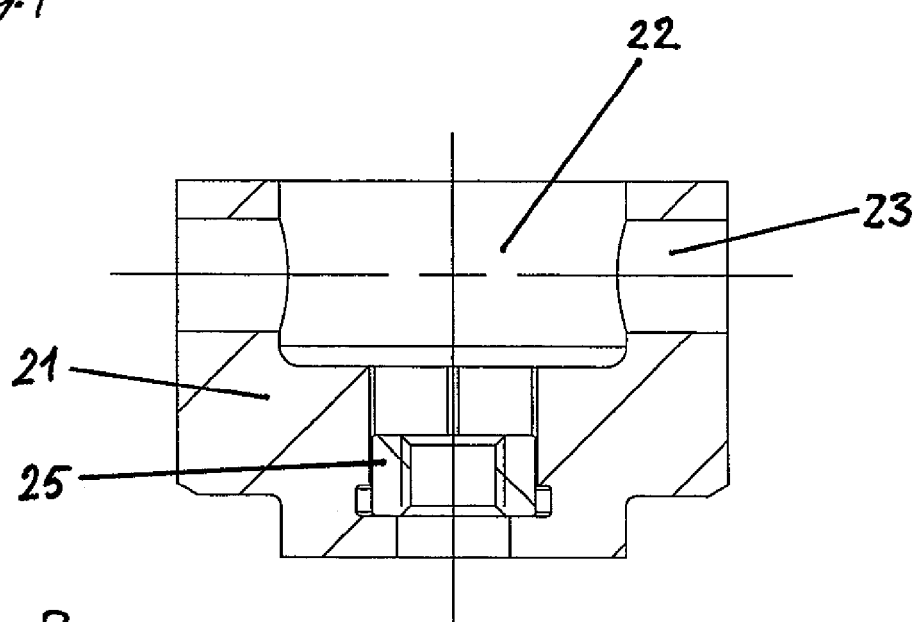
FIG. 8 shows a section through the diaphragm holder of the diaphragm valve.

In FIG. 7, a connecting nut 21 as a connecting member between the diaphragm pin 20 and the spindle arrangement is shown in sectioned representation. The diaphragm pin 20 is a metal pin, which is fastened in the center point of the diaphragm 11 and which has an external thread. The metal pin 20 is screwably connected to a small retaining nut 25. The retaining nut 25 has a height which is less than the depth of the lower part of the longitudinal bore 22 and lies with play in the axial direction into the connecting nut 21. The connecting nut 21 itself is configured as a larger nut, which is inserted in a hexagonal hole in the pressure piece 16 likewise with play in the axial direction. In FIG. 8, the connecting nut 21 together with the retaining nut 25 is shown in sectioned representation. The connecting nut 21 itself has a longitudinal bore 22 for receiving the spindle 18 and a transverse bore 23 for receiving a transverse pin 24, the latter likewise being connected to the spindle 18.

In the closing operation, the closing force is transmitted with the connecting nut 21 to the pressure piece 16 and the diaphragm 11. Upon closure of the diaphragm valve 1, the retaining nut 25 and the diaphragm pin 20 move freely upward. The effect of this is that the forces for actuating the diaphragm valve 1 are decoupled and the diaphragm 11 is subjected to the least possible load. The spindle 18 is not fixedly connected to the diaphragm 11. The handwheel 4 turns without axial motion and, during actuation, does not distance itself from the housing top part 2 of the diaphragm valve 1. The handwheel 4 is connected to the spindle nut 19 by means of a hollow splined shaft. The spindle nut 19 thus does not perform an axial motion. The spindle 18 is engaged with the thread of the spindle nut 19. The spindle nut 15 thus converts the rotary motion of the handwheel 4 into an axial motion of the connecting nut 21. Upon opening of the diaphragm valve 1, the diaphragm 11 is raised with the retaining nut 25 connected to the diaphragm pin 20.

The diaphragm valve 1 is characterized by a compact and round design. It is produced substantially from injection-molded parts. As a result of the particular configuration of the flow channel 17, the pressure loss in the diaphragm valve is minimal. As a result of the screw connection of the housing top part 2 to the housing bottom part 3, a subsequent adjustment of the diaphragm fastening is simplified and the diaphragm 11 is clamped more uniformly all the way round. In place of the handwheel 4, a pneumatic or other remote-controllable drive can also be mounted on the diaphragm valve 1.

The invention claimed is:
1. A diaphragm valve (1) comprising a housing top part (2), which receives an actuating device (4) for actuating the valve (1), and a housing bottom part (3), which has a receiving region (9) for receiving a diaphragm (11), wherein in the housing bottom part (3) beneath the diaphragm (11) is configured a central region (51) forming a flow channel (17), having a cross-sectional area wherein in an open state of the valve (1), the cross-sectional area of the flow channel (17) in the central region (51) of the housing bottom part (3) is constant as the shape of the cross-sectional area of the flow channel changes.

2. The diaphragm valve as claimed in claim 1, wherein the flow channel (17) has, at the inlet of the housing bottom part (3), a circular cross section, in the central region (51) an oval cross section, and at the outlet of the housing bottom part (3) a circular cross section.

3. The diaphragm valve as claimed in claim 2, wherein the transitions between the cross-sectional shapes of the flow channel (17) are stepless.

4. The diaphragm valve as claimed in claim 1, wherein the housing top part (2) has a substantially cylindrically configured inner housing (10) and a substantially cylindrically configured outer housing (13), the outer housing (13) being arranged such that the outer housing is screwably connected to the receiving region (9) of the housing bottom part (3).

5. The diaphragm valve as claimed in claim 4, wherein the diaphragm (11) is arranged in the receiving region (9) between a base (29) of the receiving region (9) and a bottom edge of the inner housing (10) such that the bottom edge can be clamped by means of beads (30, 31) and grooves (32, 33).

6. The diaphragm valve as claimed in claim 4, wherein, for the separate positioning of the inner housing (10) and the diaphragm (11), the housing bottom part (3) has in the receiving region (9) different axially running recesses (14, 15) which fit with cams on the inner housing (10) and projections on the diaphragm (11).

7. The diaphragm valve as claimed in claim 1, wherein a spindle (18) is arranged to connect to the diaphragm (11) by a connecting nut (21) and a transverse pin (24) and by a retaining nut (25) with play in an axial direction.

\* \* \* \* \*